United States Patent
Shibayama

(10) Patent No.: US 6,233,002 B1
(45) Date of Patent: May 15, 2001

(54) EARPHONE SYSTEM WITH OPERABILITY IMPROVED AND TERMINAL EQUIPMENT SYSTEM WITH THE EARPHONE SYSTEM

(75) Inventor: Hiroaki Shibayama, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/144,017

(22) Filed: Aug. 31, 1998

(30) Foreign Application Priority Data

Sep. 25, 1997 (JP) .................................................... 9-260219

(51) Int. Cl.⁷ ...................................................... H04N 7/14
(52) U.S. Cl. .................................. 348/14.05; 379/102.01; 379/102.03; 381/74
(58) Field of Search ........................ 379/102.03, 102.02, 379/102.01; 348/14; 455/556, 557, 575; 381/311, 74, 122, 375; 340/825.24, 825.25

(56) References Cited

U.S. PATENT DOCUMENTS

| 5,608,700 | 3/1997 | Ikeda . |
| 5,999,207 | * 12/1999 | Rodriguez et al. ................... 348/14 |

FOREIGN PATENT DOCUMENTS

| 0350269 A2 | 1/1990 | (EP) . |
| 0457492 A2 | 11/1991 | (EP) . |
| 0475297 A2 | 3/1992 | (EP) . |
| 60-199245 | 10/1985 | (JP) . |
| 2-44710 | 3/1990 | (JP) . |
| 4-334240 | 11/1992 | (JP) . |
| 5-91584 | 4/1993 | (JP) . |
| 405091584 | * 4/1993 | (JP) ................................. H04R/1/10 |
| 6-113363 | 4/1994 | (JP) . |
| 6-98281 | 4/1994 | (JP) . |
| 7-14742 | 3/1995 | (JP) . |
| 7-75160 | 3/1995 | (JP) . |
| 7-154322 | 6/1995 | (JP) . |

\* cited by examiner

*Primary Examiner*—Curtis A. Kuntz
*Assistant Examiner*—Melur Ramakrishnaiah
(74) *Attorney, Agent, or Firm*—Scully, Scott, Murphy & Presser

(57) ABSTRACT

An earphone system includes a remote control unit for transmitting a first control signal, and an earphone section operatively connected to a terminal equipment and said remote control unit. The earphone section includes a connector to be operatively connected to the terminal equipment, an earphone speaker section for outputting an audio output from an audio output signal, and a microphone for inputting an audio input to produce an audio input signal. A remote control signal processing section receives the control signal from the remote control unit. A remote control modulating and demodulating section is connected to the earphone section via a first cord and is connected to the connector via a second cord. The remote control modulating and demodulating section passes the audio input signal to the terminal equipment via the connector and the audio output signal from the terminal equipment via the connector to the earphone speaker section. Also, the remote control modulating and demodulating section modulates the control signal supplied from the remote control signal processing section to send to the terminal equipment.

14 Claims, 7 Drawing Sheets

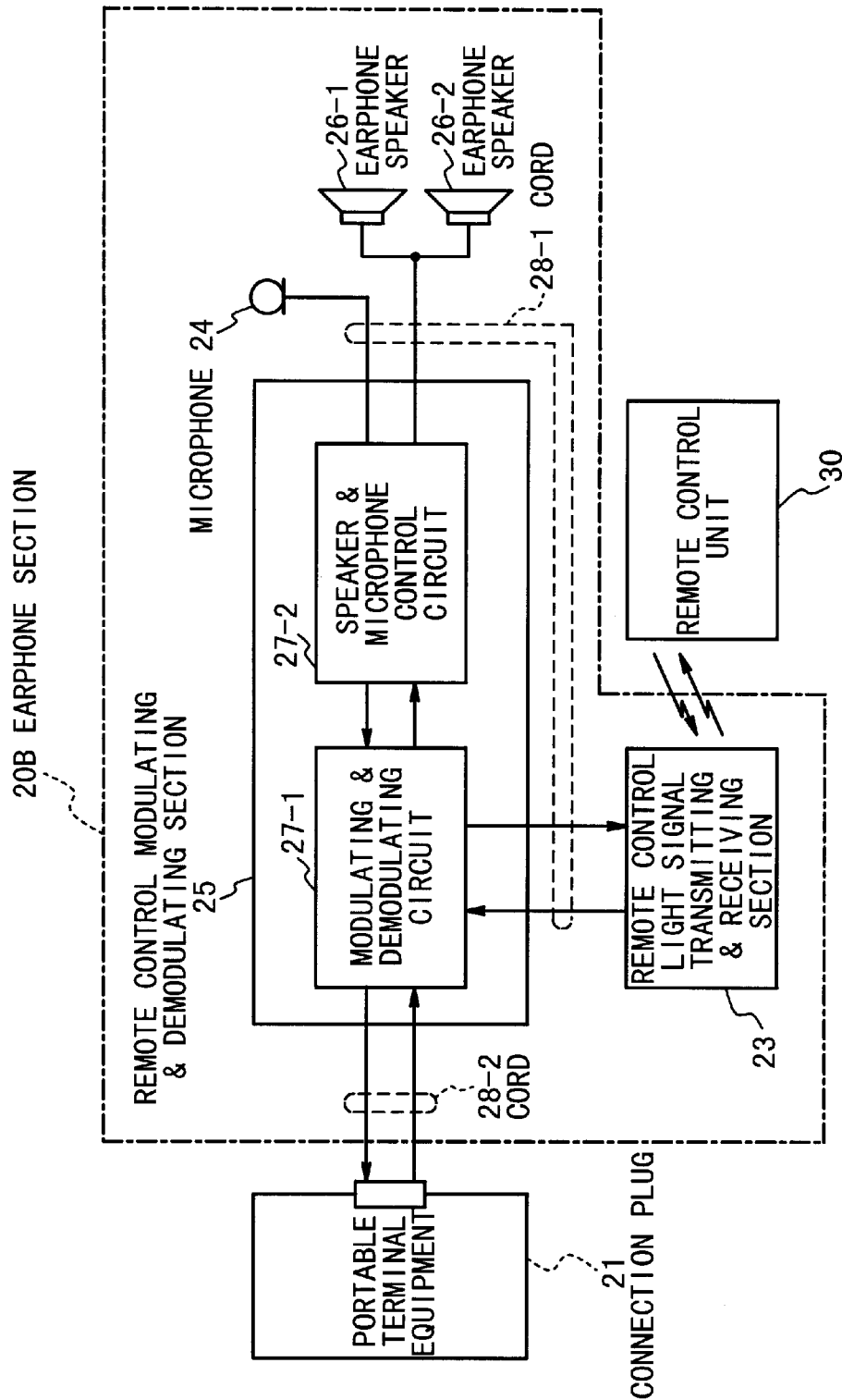

EARPHONE SYSTEM WITH OPERABILITY IMPROVED AND TERMINAL EQUIPMENT SYSTEM WITH THE EARPHONE SYSTEM

BACKGROUND OF THE INVENTION

1. Field of the Invention

The present invention relates to an earphone system and a terminal equipment system with the same, and more particularly to an earphone system including a remote control unit, and a terminal equipment system to which the earphone system is applied.

2. Description of the Related Art

An apparatus in which a sound equipment and a portable telephone are made as a unit is disclosed in, for example, Japanese Laid Open Patent Application (JP-A-Heisei 05-091584). In this apparatus, an earphone unit is connected to a portable terminal equipment. The earphone unit is provided with a microphone, dial keys and function keys for a portable telephone. The earphone unit is also provided with a pair of earphone speakers. Thus, communication is made possible in the state in which the portable terminal equipment is accommodated in a bag or pocket. Also, it is made possible to listen to speech and music from a sound equipment. Further, it is made possible to use the portable terminal equipment as a portable telephone.

It is desirable in this type of earphone that a use position of a control section of the earphone unit is limited such that the speech of a user can be appropriately collected and such that it is made easy for the user to see and to operate, when the user sets an earphone in the ear. Also, the control section needs to be made small in size and light in weight for the use purpose, of course.

However, in the above-mentioned conventional earphone unit, the plurality of dial keys and plurality of function keys for the portable telephone are provided in the control section. As a result, the control section is required to have the size corresponding to the keys, resulting in increase of the weight. Thus, it is difficult to make the remote control operation section small in size and light in weight.

Also, if small dial keys and function keys are used for the small size and lightness of the remote control operation section, the operability is degraded. It becomes a factor of any erroneous operation.

Further, when the control section is fixed on a pocket of the chest with a clip to limit the use position of the remote control operation section, the operation of the control section is difficult in the fixed state of the remote control operation section.

In addition, because it must be removed from the pocket in case of use, it is troublesome. Also, there is the possibility that the position of the microphone changes during the communication so that the sound collection characteristic of the microphone changes, resulting in degradation of the speech quality.

Otherwise, there are various proposals to listen to a sound or to see an image.

For instance, a speech transmission method using light transmission is described in Japanese Laid Open Patent Application (JP-A-Showa 60-199245). In this reference, a sound signal from a first sound equipment such as a television is converted into a light signal and emitted. The light signal is received and converted into an electric signal by a second sound equipment which is located apart from the first sound equipment. Thus, sound is transferred from the first sound equipment to the second sound equipment.

Also, a telescope with an optical type speech communication apparatus is described in Japanese Laid Open Utility Model Application (JP-U-Heisei 2-44710). In this reference, a telescope is provided with a light transmitting section composed of a microphone, a modulator, a light emitting element, a cold filter and an object lens, and a light receiving section composed of an earphone, a demodulator, a light receiving element, a cold filter and an object lens.

A telephone with a hearing aid is described in Japanese Laid Open Utility Model Application (JP-U-Heisei 7-14742). In this reference, an adapter 3 composed of a microphone 4, an amplifier 5 and a light emitting element 6 is attached to a speech receiving section 1 of a telephone. A speech signal from the speech receiving section 1 is converted into a light signal by the light emitting element 6. The light signal is received by a light receiving element of a hearing aid 9, and is amplified and outputted from an earphone 13.

A remote sensing apparatus is described in Japanese Laid Open Patent Application (JP-A-Heisei 6-98281 which corresponds to a U.S. patent application Ser. No. 844072 filed on Mar. 2, 1992). In this reference, a remote sensing apparatus (50) containing at least one of a display (88), an earphone (91) and a microphone (90) is connected to a driver (65, 74) by an optical link (80).

A method of individually receiving sound broadcasting is described in Japanese Laid Open Patent Application (JP-A-Heisei 7-154322). In this reference, each of users has a light signal receiver 4. A light signal transmitter 2 has a limited transmittable zone and provides information in the form of light signal. When the user enters the transmittable zone, the information is transferred from the transmitter 2 to the receiver 4 using light communication. Then, the information is reproduced.

However, the above-mentioned references never improve the operability and controllability of an equipment.

SUMMARY OF THE INVENTION

The present invention is accomplished to solve the above-mentioned problems. Therefore, an object of the present invention is to provide an earphone system which is small in size and light in weight and which is superior in the operability.

Another object of the present invention is to provide a terminal equipment system using such an earphone system.

Still another object of the present invention is provide a method of operating a terminal equipment with good operability.

In order to achieve an aspect of the present invention, an earphone system includes a remote control unit for transmitting a control signal, and an earphone section provided apart from the remote control unit and operatively connected to an external apparatus and the remote control unit. The earphone section includes a connector to be operatively connected to the external apparatus, an earphone speaker section for outputting an audio output from an audio output signal, and a microphone for inputting an audio input to produce an audio input signal. A remote control signal processing section receives the control signal from the remote control unit. A remote control modulating and demodulating section is connected to the earphone section via a first cord and connected to the connector via a second cord. The remote control modulating and demodulating section passes the audio input signal supplied from the microphone to the external apparatus via the connector and the audio output signal supplied from the external apparatus via the connector to the earphone speaker section. Also, the remote control modulating and demodulating section modulates the control signal supplied from the remote control signal processing section to send to the external apparatus.

The earphone speaker section may include an earphone speaker and the remote control signal processing section may be provided to the earphone speaker. Also, the microphone may be provided in the remote control modulating and demodulating section. Instead, the earphone speaker section may include two earphone speakers and the microphone may be provided in a branching portion for the two earphone speakers.

When the remote unit includes a plurality of keys, the control signal is generated in response to an operation of at least one of the plurality of keys. The remote control signal processing section transmits a reply signal to the remote control unit when the control signal is correctly received. The remote control unit transmits the control signal to the earphone section again when the reply signal is not received from the remote control signal processing section.

In the above, communication between the remote control unit and the remote control signal processing section may be performed based on radio communication. Alternately, communication between the remote control unit and the remote control signal processing section may be performed based on light signal communication.

In order to achieve another aspect of the present invention, a portable terminal system includes a terminal equipment, a remote control unit for transmitting a control signal, and an earphone section provided apart from the remote control unit and operatively connected to an terminal equipment and the remote control unit. The earphone section includes a connector to be operatively connected to the terminal equipment, an earphone speaker section for outputting an audio output from an audio output signal, a microphone for inputting an audio input to produce an audio input signal, and a remote control signal processing section for receiving the control signal from the remote control unit, and for transmitting a demodulated reply signal to the remote control unit. A remote control modulating and demodulating section is connected to the earphone section via a first cord and connected to the connector via a second cord. The remote control modulating and demodulating section passes the audio input signal supplied from the microphone to the external apparatus via the connector and the audio output signal supplied from the terminal equipment via the connector to the earphone speaker section. Also, the remote control modulating and demodulating section modulates the control signal from the remote control signal processing section to send to the terminal equipment via the connector and demodulating a reply signal supplied from the terminal equipment via the connector to generate the demodulated reply signal and to send to the remote control signal processing section, the reply signal being generated by the terminal equipment in response to the control signal.

In order to achieve still another aspect of the present invention, a method of operating a terminal equipment, includes the steps of:

generating a control signal by a remote control unit in response to an operation of one of a plurality of function keys, a terminal equipment having a plurality of functions respectively corresponding to the plurality of function keys;

transmitting the control signal from the remote control unit to the terminal equipment via an earphone section;

starting one of the plurality of functions in the terminal equipment in response to the control signal to send back a reply signal to the earphone section; and replying the replay signal from earphone section to the remote control unit.

When the one of the plurality of function keys is a communication key, a dial tone corresponding to the dial tone signal generated by the terminal equipment in response to the control signal is outputted from an earphone speaker section of the earphone section. Also, a second control signal is generated from a remote control unit in response to an operation of at least one of a plurality of dial keys, when the dial tone is outputted from the earphone speaker section. When a communication channel is established with a counter side corresponding to the at least one of the plurality of dial keys, sending an audio signal inputted from a microphone of the earphone section to the counter side via the terminal equipment and sending an audio signal transmitted from the counter side to the earphone speaker section via the terminal equipment.

When the terminal equipment has an imaging function by a video camera, the imaging function is started by the video camera, when the communication channel is established with the counter side corresponding to the at least one of the plurality of dial keys.

When the terminal equipment has a music reproducing function, a music sound corresponding to the audio output signal is outputted from an earphone speaker section of the earphone section.

When the terminal equipment has a video reproducing function to display an image on a display unit, an image corresponding to the image signal is displayed on the display unit, and an audio output corresponding to the audio output signal is outputted from the earphone speaker section of the earphone section.

When the terminal equipment has a display section and a search function to search a data base, a specific data obtained by searching the data base is displayed to the display section.

BRIEF DESCRIPTION OF THE DRAWINGS

FIG. 4 is a block diagram illustrating the structure of the earphone system according to the second embodiment of the present invention;

DESCRIPTION OF THE PREFERRED EMBODIMENTS

Next, a terminal equipment system using an earphone system of the present invention will be described with reference to the attached drawings.

Figure 1A:
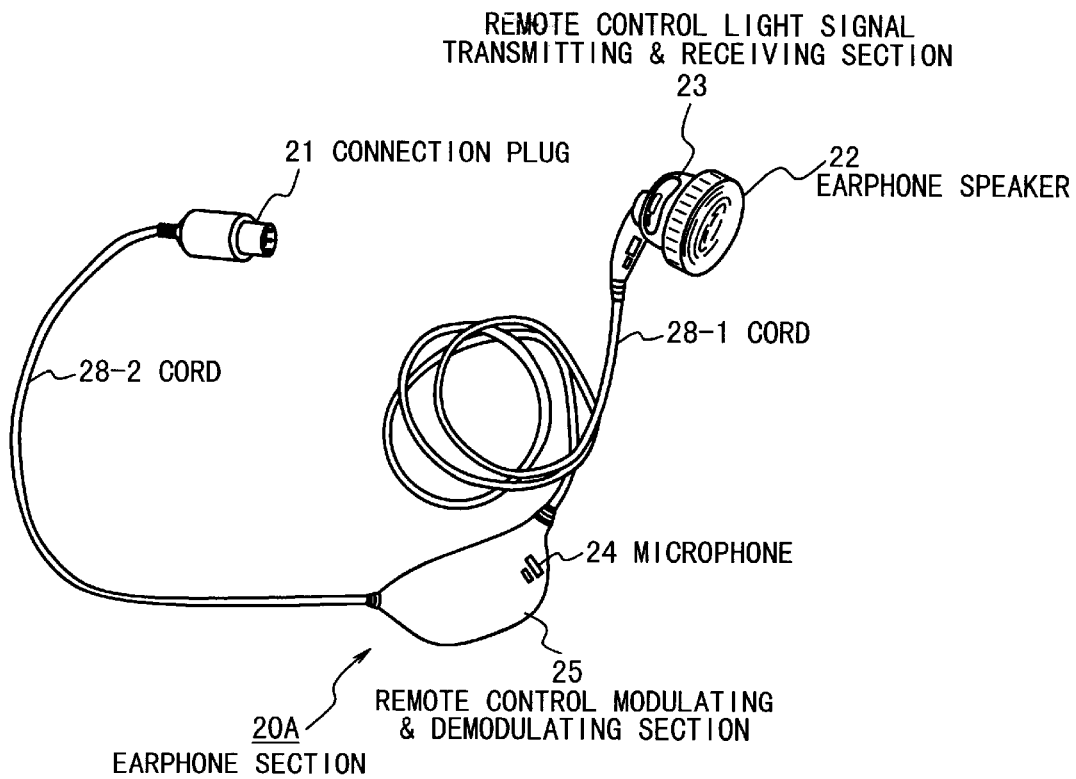
FIG. 1A is a perspective view of an earphone system 10A according to a first embodiment of the present invention.
Figure 1B:
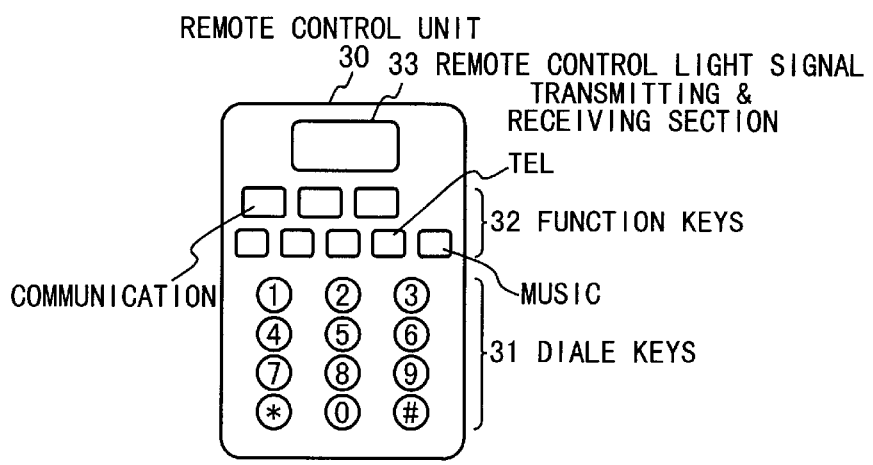
FIG. 1B is a diagram showing a remote control unit.

FIG. 1A is a perspective view of an earphone system according to the first embodiment of the present invention, and FIG. 1B is a diagram showing a remote control unit. Referring to FIGS. 1A and 1B, the earphone system 10A according to the first embodiment is composed of an earphone section 20A which is connected to a terminal equipment (not shown) such as a portable terminal equipment with an audio recording and reproducing function and a picture recording and reproducing function in addition to a telephone function. A remote control unit 30 controls the portable terminal equipment through the earphone section 20A.

The earphone section 20A is composed of a connection plug 21, an earphone speaker 22 with a remote control light signal transmitting and receiving section 23, and a remote control modulating and demodulating section 25 with a microphone 24. The connection plug 21 and the remote control modulating and demodulating section 25 are connected by a cord 28-2. Also, the earphone speaker 22 and the remote control modulating and demodulating section 25 are connected by a cord 28-1.

The connection plug 21 is connected to the portable terminal equipment (not shown). The earphone speaker 22 outputs an audio output such as telephone speech and music from the portable terminal equipment. The remote control light signal transmitting and receiving section 23 is arranged on an opposite side to a speech receiving end of the earphone speaker 22. The remote control light signal transmitting and receiving section 23 receives various light control signals and dial signals from the remote control unit 30 to convert the received light control signals and dial signals into electric control signals and dial signals. Also, the remote control light signal transmitting and receiving section 23 convert an electric reply signal into a light reply signal to transmit to the remote control unit 30.

The remote control modulating and demodulating section 25 contains the microphone 24 to collect a speech uttered from a user. The remote control modulating and demodulating section 25 passes an audio input signal inputted from the microphone to the terminal equipment and an audio output signal to the earphone speaker 22. The remote control modulating and demodulating section 25 converts the control signals and dial signals to have predetermined signal forms so that the control signals and dial signals can be exchanged between the terminal equipment and the remote control unit 30.

It should be noted that the remote control modulating and demodulating section 25 has a clip (not shown) on the side opposite to the transmission end with the microphone 24 such that the remote control modulating and demodulating section 25 can be fixed on a pocket.

The remote control unit 30 has various function keys 32 such as a communication key, a music key and a telephone address key. The communication key is used to start and end the telephone function of the terminal equipment. The music key is used to start and end the music reproducing function of the terminal equipment. The terminal equipment has a data base in which telephone numbers are stored. The telephone address key is used to read the telephone numbers from the data base to display them on a display unit.

Also, the remote control unit 30 has dial keys 31 which are used to dial to a counter end, when the telephone function of the terminal equipment is started in response to the communication key.

Further, the remote control unit 30 includes a remote control signal transmitting and receiving section 33 to transmit light control signals corresponding to the operations of the function keys and dial keys to the remote control light signal transmitting and receiving section 23 of the earphone section 20A. The remote control signal transmitting and receiving section 33 to receives a light reply signal from the remote control light signal transmitting and receiving section 23 to control the internal operation of the remote control unit 30.

Figure 2:
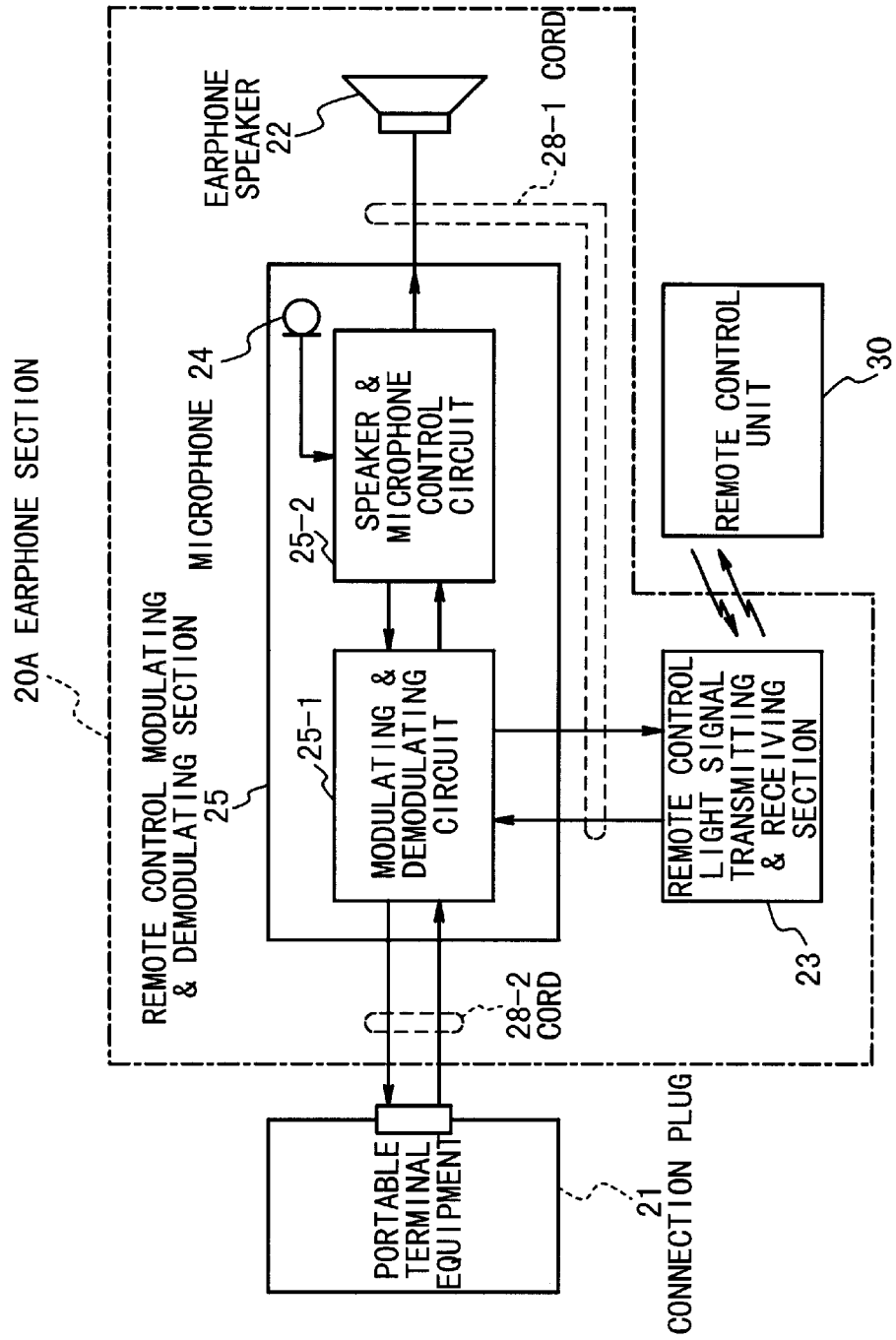
FIG. 2 is a block diagram illustrating the structure of the earphone system according to the first embodiment of the present invention.

Next, the circuit structure will be described with reference to FIGS. 1A and 1B in addition to FIG. 2. FIG. 2 is a block diagram of the earphone system 20A according to the first embodiment. The earphone section 20A are composed of the remote control modulating and demodulating section 25, the remote control light signal transmitting and receiving section 23 and an earphone speaker 22. The earphone section 20A is connected to the portable terminal equipment by the connection plug 21.

The remote control modulating and demodulating section 25 is composed of the microphone 24, a modulating and demodulating circuit 25-1, and a speaker and microphone control circuit 25-2. The microphone 24 collects the speech which the user utters. The modulating and demodulating circuit 25-1 converts various control signals and dial signals which are sent and received to and from the portable terminal equipment and remote control light signal transmitting and receiving section 23, into predetermined signal forms. The speaker and microphone control circuit 25-2 controls the electrical disconnection of a speech transmission output from the microphone 24 and the electrical disconnection of a speech reception signal to the speaker.

Next, the operation of the terminal equipment system using the earphone system will be described below. The small portable terminal equipment has a telephone function such as a portable telephone and a sound function such as a cassette player, a CD player and an MD player. The case where the telephone function of the portable terminal equipment is used as an independent portable telephone will be described.

The user sets the earphone speaker 22 in the ear and pushes a "communication" key of the function keys 32 of the remote control unit 30, to select a telephone mode. The push information of this "communication" key is transmitted from the remote control signal transmitting and receiving section 33 of the remote control unit 30 to the remote control light signal transmitting and receiving section 23 of the earphone section 20A. In this example, the push information is transmitted as a light signal such as an infrared ray. However, the push information may be transmitted as a radio signal. The remote control light signal transmitting and receiving section 23 sends the received push information of the "communication" key to the remote control modulating and demodulating section 25 through the cord 28-1.

The modulating and demodulating circuit 25-1 of the remote control modulating and demodulating section 25 converts the push information of the "communication" key into a predetermined signal form and to transmit to the portable terminal equipment through the cord 28-2. At the same, the modulating and demodulating circuit 25-1 controls the speaker and microphone control circuit 25-2 to electrically disconnect the speaker 22 and microphone 24.

When an electric reply signal is transmitted from the portable terminal equipment, the remote control modulating and demodulating circuit 25 transmits the reply signal to the remote control unit 30 via the remote control light signal transmitting and receiving section 23. Then, the modulating and demodulating circuit 25-1 waits for the sending-back of a dial tone signal.

When the dial tone signal is sent back from the portable terminal equipment, it is supplied to the speaker and microphone control circuit 25-2 through the modulating and demodulating circuit 25-1. Then, the speaker and microphone control circuit 25-2 controls the earphone speaker 22 to output a dial tone corresponding to the dial tone signal.

The user operates the dial keys 31 of the remote control unit 30 to input a telephone number of a counter side, after the dial tone is confirmed by the earphone speaker 22. The dial key information is transmitted from the remote control unit 30 to the modulating and demodulating circuit 25-1 through the remote control light signal transmitting and receiving section 23. The dial key information is converted into the predetermined signal form by the modulating and demodulating circuit 25-1 and is transmitted to the portable terminal equipment through the cord 28-2. Thus, the response waiting state is set. When the counter side replies, the communication channel is established and the user communicates with the counter side by use of the microphone 24 and the earphone speaker 22.

In case of arrival of any call, when the call signal arrives, the speaker of the portable terminal equipment rings. The user recognizes the call arrival and pushes a "response" key (not shown) of the function keys 32 of the remote control unit 30. At this time, the modulating and demodulating circuit 25-1 of the remote control modulating and demodulating section 25 controls the speaker and microphone control unit 25-2 to electrically disconnect the microphone 24 and the earphone speaker 22 for preparation of communication.

The push information of the "response" key is emitted as a light signal such as an infrared ray from the remote control unit 30. The push information is received by the remote control light signal transmitting and receiving section 23, and is transmitted to the modulating and demodulating circuit 25-1 of the remote control modulating and demodulating section 25 through the cord 28-1. Then, after being converted into the predetermined signal form, the push information of the "response" key is sent back to the portable terminal equipment through the cord 28-2.

Next, the case that sound and music is listened from the sound equipment of the portable terminal equipment will be described.

The user sets the earphone section 20A in the ear and pushes the "music" key of the function keys 32 of the remote control unit 30. The push information of the "music" key is emitted as a light signal from the remote control signal transmitting and receiving section 33 of the remote control unit 30 and then is received by the modulating and demodulating circuit 25-1 of the remote control modulating and demodulating section 25 through the remote control light signal transmitting and receiving section 23. Then, after being converted into the predetermined signal form, the push information of the "music" key is transmitted to the portable terminal equipment through the cord 28-2. In this manner, for example, a CD player (a sound function of the terminal equipment) is initiated and starts to reproduce.

The reproduced music signal of the CD player is transmitted from the portable terminal equipment and is inputted to the remote control modulating and demodulating section 25 through the cord 28-2. Then, the reproduced music signal is transmitted to the earphone speaker 22 through the modulating and demodulating circuit 25-1 and the speaker and microphone control unit 25-2.

It should be noted that the modulating and demodulating circuit 25-1 controls the speaker and microphone control unit to electrically disconnect a transmission circuit of the microphone 24 in advance when the push information of the "music" key is received.

The earphone system 10B according to the second embodiment of the present invention will be described below in detail with reference to FIG. 3.

The earphone system 10B according to the second embodiment is composed of an earphone section 20B connected to a portable terminal equipment (not shown) and a remote control unit 30. The terminal equipment is equipped with a sound equipment and a picture equipment. The remote control unit 30 is used to control the portable terminal equipment through the earphone section 20B.

The earphone section 20B is composed of a connection plug 21, a remote control modulating and demodulating section 27, a microphone 24 and a pair of earphone speakers 26-1 and 26-2. The connection plug 21 is connected to the portable terminal equipment. The pair of earphone speakers 26-1 and 26-2 output a sound output such as telephone speech and music from an audio output signal supplied from the portable terminal equipment. The remote control light signal transmitting and receiving section 23 is arranged on an opposite side to a speech receiving end of the earphone speaker 26-2, to receive various control signals and dial signals from the remote control unit 30 and to send a reply signal to the remote control unit 30. The microphone 24 is arranged in a branch position of the earphone speakers 26-1 and 26-2 to collect a speech uttered from the user. The remote control modulating and demodulating section 27 converts into predetermined signal forms, the various control signals and dial signals which are received by the remote control light signal transmitting and receiving section 23, and transmits the converted signals to the portable terminal equipment. A cord 28-1 connects the remote control modulating and demodulating section 25 and the earphone speakers 26-1 and 26-2 and the microphone 24, and a cord 28-2 connects the remote control modulating and demodulating section 25 and the connection plug 21.

It should be noted that the remote control modulating and demodulating section 27 has a clip (not shown) arranged on the side opposite to the transmission mouth with microphone 24 so as to fix the remote control modulating and demodulating section 27 on a pocket.

Also, the remote control unit 30 is same as the first embodiment. The remote control unit 30 has various dial keys 31 and function keys 32 for the portable telephone function of the portable terminal equipment. The remote control unit 30 includes the remote control light signal transmitting and receiving section 33 to send and receive a dial key signal and various function key signals to and from the remote control light signal transmitting and receiving section 23.

FIG. 4 is the block diagram of the earphone system 10B according to the second embodiment. The earphone section 20B is composed of the microphone 24, the remote control modulating and demodulating section 27, the remote control light signal transmitting and receiving section 23 and the earphone speakers 26-1 and 26-2. The earphone section is connected to the portable terminal equipment by the connection plug 21.

The remote control modulating and demodulating section 27 is composed of a modulating and demodulating circuit 27-1 and a speaker and microphone control circuit 27-2. The modulating and demodulating circuit 27-1 converts the various control signals and dial signals which are sent and the remote control light signal transmitting and receiving section 23 into predetermined signal forms, and converts a reply signal supplied from the portable terminal equipment into a predetermined signal form. The speaker and microphone control circuit 27-2 controls the electrical disconnection of a speech transmission output from the microphone 24 and the electrical disconnection of a speech receiving signal to the earphone speakers 26-1 and 26-2.

Figure 3A:
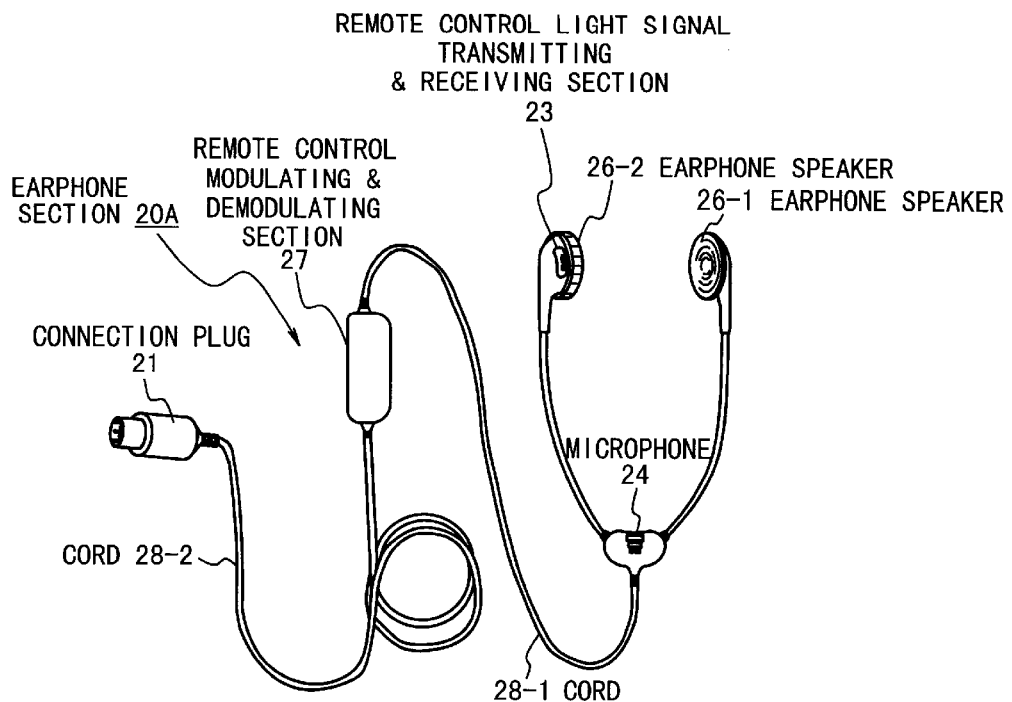
FIG. 3A is a perspective view of the earphone system according to a second embodiment of the present invention.
Figure 3B:
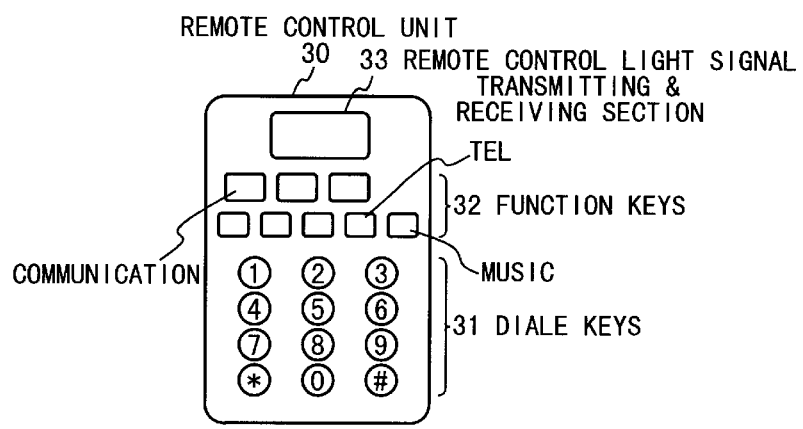
FIG. 3B is a diagram showing a remote control unit.

It should be noted that as shown in FIG. 3, the earphone section 20B is formed in such a manner that the cord 28-1 of the earphone section 20A which is shown in FIG. 1 is branched on the way to the earphone speakers 26-1 and 26-2. The microphone 24 which is built in the remote control modulating and demodulating section 25 in the first embodiment is moved to the branch position of the cord 28-1 in the second embodiment. Because the operation is the same as the above-mentioned earphone section 20A, the description will be omitted. However, the same effect as in the first embodiment is obtained.

Figure 5A:
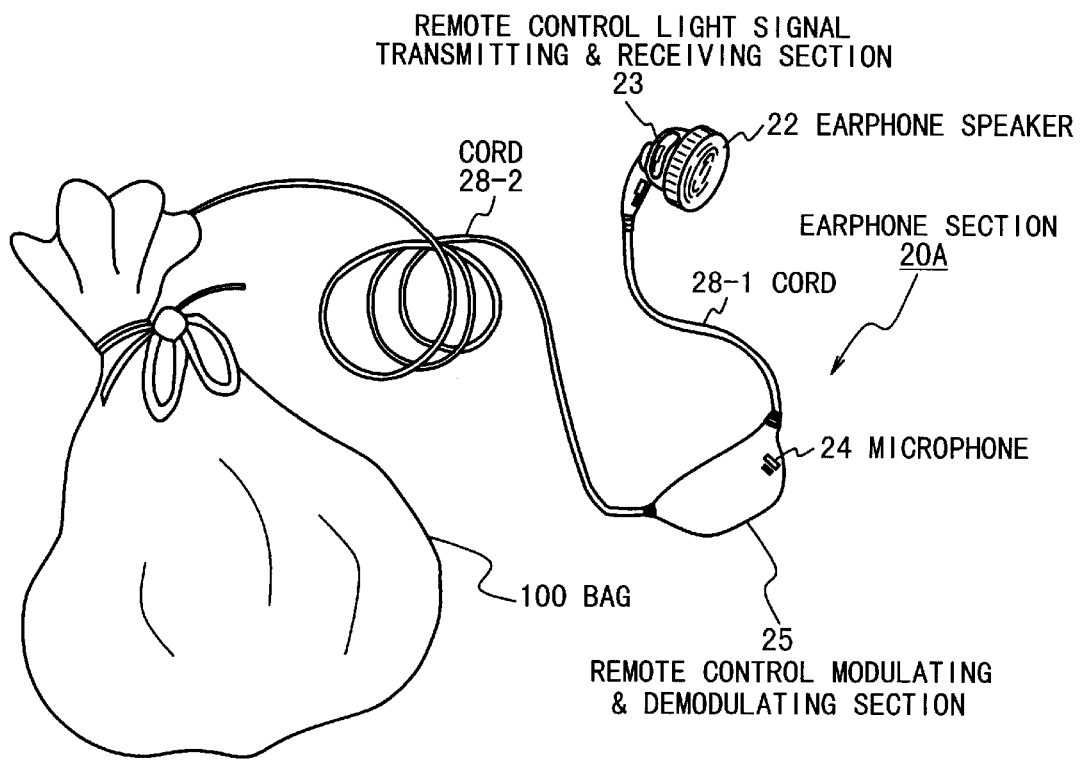
FIGS. 5A and 5B are perspective views of a terminal equipment system in a use example of a portable terminal equipment with a sound function using the earphone system according to the first embodiment of the present invention.

Next, the use example of a terminal equipment system using the earphone system of the present invention will be described. FIG. 5A is a perspective view illustrating the use example of the sound function of the portable terminal equipment using the earphone system according to the first embodiment, and FIG. 5B shows the remote control unit.

Figure 5B:
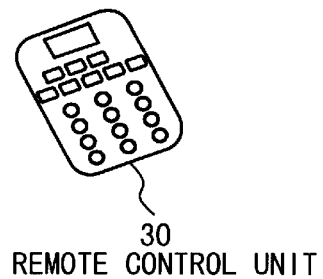

In the use example of the terminal equipment system using the earphone system which is shown in FIGS. 5A and 5B, the earphone section 20A of the first earphone system which is shown in FIG. 1 is connected to the portable terminal equipment. Also, the portable terminal equipment is stored in a back 100 so as to be carried.

When origination of a call is accomplished using the portable telephone function of the portable terminal equipment in this state, the earphone speaker 22 is set in the ear and the remote control unit 30 is operated such that the communication key of the function keys 32 is first operated. The control signal corresponding to the operation of the communication key is transmitted from the remote control unit 30 to the terminal equipment via the remote control light signal transmitting and receiving section 23 and the remote control modulating and demodulating section 25 in the earphone section 20A. Then, a replay signal is sent back from the terminal equipment to the remote control unit 30 the remote control light signal transmitting and receiving section 23 and the remote control modulating and demodulating section 25 in the earphone section 20A. Subsequently, a dial tone signal as an audio output signal is generated from the terminal equipment and transmitted to the earphone speaker 22. The earphone speaker 22 outputs a dial tone. When hearing the dial tone, the user operates the remote control unit 30 to enter a telephone number of a desired counter side, in a state in which the portable terminal equipment is stored in the back. It is possible to communicate just as it is, if the counter side replies. That is, the audio input signal from the microphone 24 as a speech transmitting signal is supplied to the counter side via the terminal equipment and the audio output signal as a speech receiving signal is supplied to the earphone speaker 22 via the terminal equipment.

Therefore, the operability is improved because it is not necessary to take out the portable terminal equipment from the back 100 and to operate it.

Also, various dial keys and function keys which are conventionally arranged in an operation section of the earphone section are arranged in the remote control unit 30. Therefore, the remote control modulating and demodulating section (equivalent to the conventional operation section) which has been fixed on the pocket with a clip can be made small and light.

Moreover, because various dial keys and function keys are arranged in the remote control unit 30, it is not necessary to take out the operation section and to fix it to the pocket by the clip, unlike the conventional example. Therefore, since the operation error can be avoided, and a position of the microphone is fixed, the sound collecting characteristic becomes stable and the good speech quality can be secured.

Figure 6A:
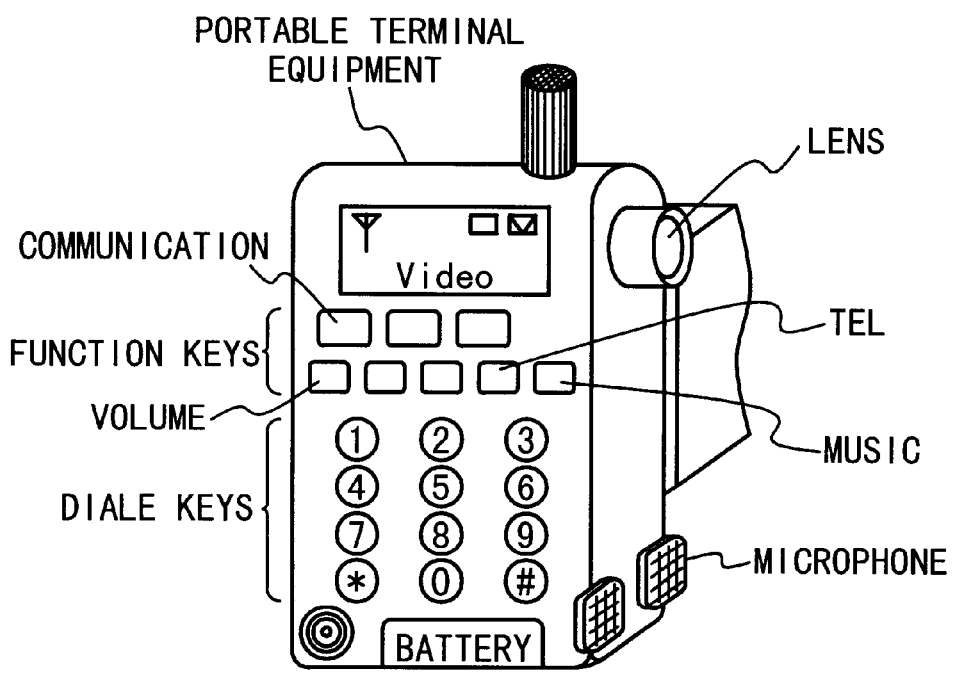
FIG. 6A is a perspective view of a portable terminal equipment.
Figure 6B:
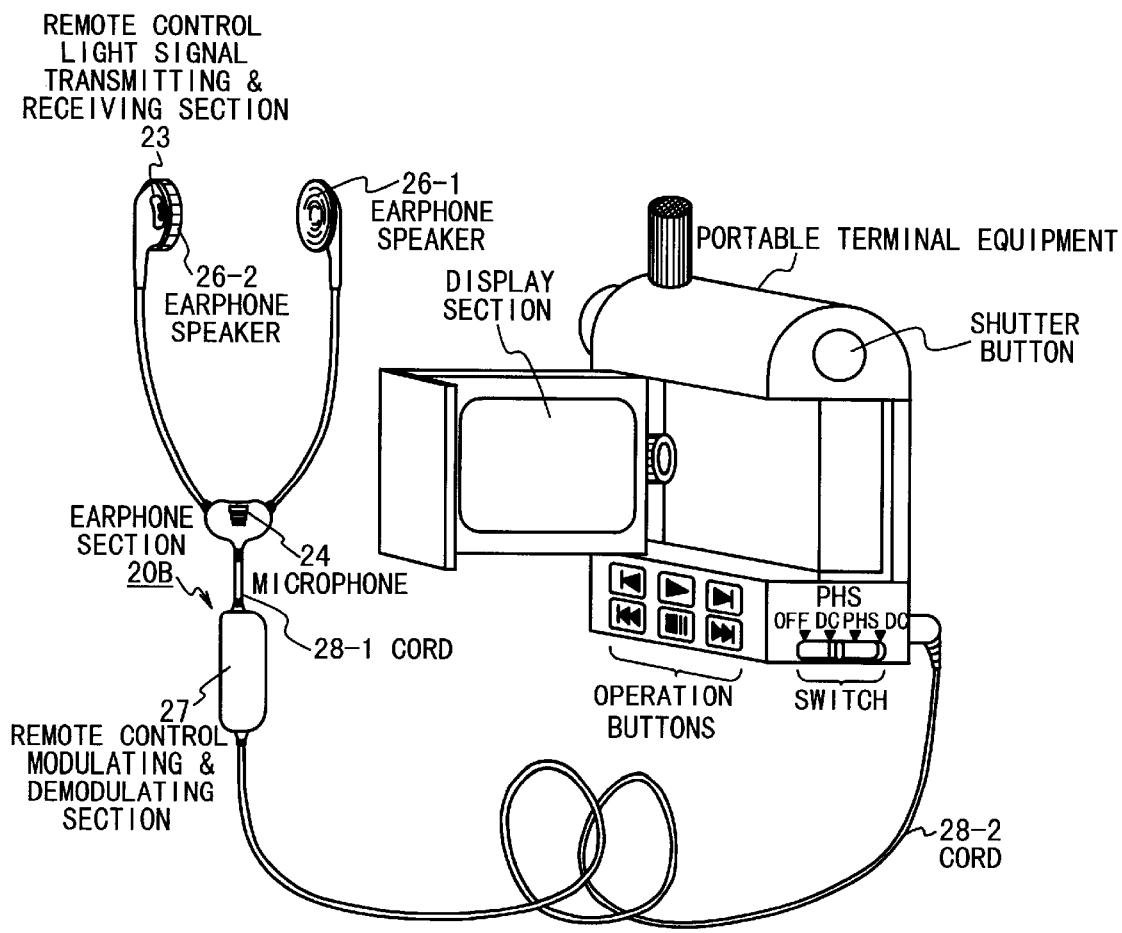
FIG. 6B is a perspective views of the terminal equipment system in a use example of the portable terminal equipment with a TV camera using the earphone system according to the second embodiment.
Figure 6C:
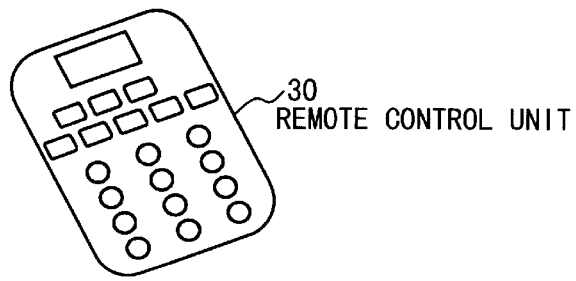
FIG. 6C is a back view of the terminal equipment.

Next, another use example of the terminal equipment system using the earphone system of the present invention will be described. FIG. 6A is a perspective view of a terminal equipment. FIG. 6B is a perspective view illustrating the use example of a terminal equipment system using the earphone system according to the second embodiment of the present invention, and FIG. 6C shows the remote control unit 30. The portable terminal equipment has an imaging function by a TV camera, a display function by a display section, a sound recording and reproducing function using a unit such as a CD player, an image recording and reproducing function using the TV camera and the display section, in addition to the telephone function.

In the use example of the earphone system which is shown in FIGS. 6A to 6C, the earphone section 20B of the second earphone system which is shown in FIG. 3 is connected to the portable terminal equipment. Thus, using the video camera as the imaging function of the portable terminal equipment, bidirectional communication of the sound and image is performed, or the image which is imaged by the video camera is displayed on the display section.

In case that the telephone function of the portable terminal equipment is used, a control signal corresponding to the communication key of the function keys 32 is generated by the remote control unit in response to an operation of the communication key. The control signal is transmitted from the remote control unit to the terminal equipment via the earphone section. When the telephone function of the terminal equipment is started in response to the control signal, a reply signal is sent back to the earphone section. The reply signal is sent back from the terminal equipment to the remote control unit via the earphone section. Then, a dial tone corresponding to a dial tone signal is outputted from an earphone speaker section of the earphone section. When hearing the dial tone, the user operates the remote control unit such that a control signal is generated from a remote control unit in response to an operation of the dial keys.

When a communication channel is established with a counter side corresponding to the operated dial keys, an audio signal inputted from a microphone of the earphone section is transmitted to the counter side via the terminal equipment and an audio signal transmitted from the counter side is reproduced by the earphone speaker section via the terminal equipment.

When the terminal equipment has an imaging function by a video camera, the imaging function by the video camera may be started, when the communication channel is established with the counter side corresponding to the operated dial keys.

When the terminal equipment has a music recording and reproducing function by a unit such as a tape recorder and a CD player, a second control signal is generated by the remote control unit in response to an operation of a music key of the plurality of function keys 32. The control signal is transmitted from the remote control unit to the terminal equipment via the earphone section. When receiving the control signal, the terminal equipment outputs a reply signal to the remote control unit 30 via the earphone section. Also, the terminal equipment starts the music reproducing function in response to the second control signal to output an audio output signal corresponding to a reproduced music. The music sound corresponding to the audio output signal sent out from the terminal equipment is reproduced by an earphone speaker section of the earphone section.

When the terminal equipment has a video recording and reproducing function by a unit such as a video tape recorder to display an image on a display unit, a video key (not shown) is operated in the remote control unit such that a control signal is generated. The control signal is sent to the terminal equipment through the earphone section. When receiving the control signal, the terminal equipment outputs a reply signal to the remote control unit 30 via the earphone section. Also, the terminal equipment starts the video reproducing function in response to the control signal to output an audio output signal and image signal corresponding to a reproduced video data. The image corresponding to the image signal is displayed on the display unit, and an audio output corresponding to the audio output signal is reproduced by the earphone speaker section of the earphone section.

The terminal equipment may have a display section, a data base such as a telephone number guide book and a search function to search the data base. In this case, an information function key (TEL) of the remote control unit is operated such that a control signal is generated in response to the operation of the plurality of function keys. The control signal is transmitted from the remote control unit to the terminal equipment via an earphone section. When receiving the control signal, the terminal equipment outputs a reply signal to the remote control unit 30 via the earphone section. Also, the terminal equipment starts the search function to access the data base in the terminal equipment in response to the control signal to output a specific data. The specific data is displayed on the display section. Thus, the user can easily know the desired telephone number.

As described above, in the terminal equipment system using the earphone system of the present invention, even if the portable terminal equipment is stored in a back 100 so as to be carried, and origination of a call is accomplished using the portable telephone function of the portable terminal equipment in this state. Thus, it is possible to communicate just as it is, if the counter side replies. Therefore, the operability is improved because it is not necessary to take out the portable terminal equipment from the back and to operate it.

Also, various dial keys and function keys which are conventionally arranged in the operation section of the earphone section are arranged in the remote control unit. Therefore, the remote control modulating and demodulating section (equivalent to the conventional operation section) is not necessary to be fixed to the pocket with a clip. Therefore, the earphone system can be made small and light.

Moreover, because various dial keys and function keys are arranged in the remote control section, it is not necessary to take out the operation section and to fix it to the pocket with the clip, unlike the conventional example. Therefore, the operation error can be avoided. Also, since a position of the microphone is fixed, the sound collecting characteristic becomes stable and the good speech quality can be secured.

In addition, the earphone system can be applied to the communication based on the portable telephone function, in addition to listening speech and music produced by sound equipment. Therefore, the generality is improved.

What is claimed is:

1. An earphone system comprising:
    a remote control unit for transmitting a control signal; and
    an earphone section provided apart from said remote control unit and operatively connected to an external apparatus and said remote control unit, and
    wherein said earphone section comprises:
        a connector to be operatively connected to said external apparatus;
        an earphone speaker section for outputting an audio output from an audio output signal;
        a microphone for inputting an audio input to produce an audio input signal;
        a remote control signal processing section for receiving the control signal from said remote control unit; and
        a remote control modulating and demodulating section connected to said earphone section via a first cord and connected to said connector via a second cord, for passing said audio input signal supplied from said microphone to said external apparatus via said connector and said audio output signal supplied from said external apparatus via said connector to said earphone speaker section, and for modulating said control signal supplied from said remote control signal processing section to send to said external apparatus.

2. An earphone system according to claim 1, wherein said earphone speaker section includes an earphone speaker and said remote control signal processing section is provided to said earphone speaker.

3. An earphone system according to claim 1, wherein said microphone is provided in said remote control modulating and demodulating section.

4. An earphone system according to claim 1, wherein said earphone speaker section includes two earphone speakers and said microphone is provided in a branching portion for said two earphone speakers.

5. An earphone system according to claim 1, wherein said remote unit includes a plurality of keys, and said control signal is generated in response to an operation of at least one of said plurality of keys.

6. An earphone system according to claim 5, wherein said remote control signal processing section transmits a reply signal to said remote control unit when said control signal is correctly received.

7. An earphone system according to claim 6, wherein said remote control unit transmits said control signal to said earphone section again when said reply signal is not received from said remote control signal processing section.

8. An earphone system according to claim 1, wherein communication between said remote control unit and said remote control signal processing section is performed based on radio communication.

9. An earphone system according to claim 1, wherein communication between said remote control unit and said remote control signal processing section is performed based on light signal communication.

10. A portable terminal system comprising:
    a terminal equipment;
    a remote control unit for transmitting a control signal; and
    an earphone section provided apart from said remote control unit and operatively connected to an terminal equipment and said remote control unit, and wherein said earphone section comprises:
        a connector to be operatively connected to said terminal equipment;

an earphone speaker section for outputting an audio output from an audio output signal;

a microphone for inputting an audio input to produce an audio input signal;

a remote control signal processing section for receiving the control signal from said remote control unit, and for transmitting a demodulated reply signal to said remote control unit; and a remote control modulating and demodulating section connected to said earphone section via a first cord and connected to said connector via a second cord, for passing said audio input signal supplied from said microphone to said external apparatus via said connector and said audio output signal supplied from said terminal equipment via said connector to said earphone speaker section, and for modulating said control signal from said remote control signal processing section to send to said terminal equipment via said connector and demodulating a reply signal supplied from said terminal equipment via said connector to generate the demodulated reply signal and to send to said remote control signal processing section, said reply signal being generated by said terminal equipment in response to said control signal.

11. A portable terminal system according to claim 10, wherein said remote unit includes a plurality of function keys and a plurality of dial keys, and said control signal is generated in response to an operation of one of said plurality of function keys.

12. A portable terminal system according to claim 11, wherein said remote control unit transmits said control signal to said earphone section again when said demodulated reply signal is not received from said remote control signal processing section.

13. A portable terminal system according to claim 10, wherein communication between said remote control unit and said remote control signal processing section is performed based on radio communication.

14. A portable terminal system according to claim 10, wherein communication between said remote control unit and said remote control signal processing section is performed based on light signal communication.

* * * * *